United States Patent [19]

Loofbourow et al.

[11] 4,103,846
[45] Aug. 1, 1978

[54] FILM WEB HANDLING MECHANISM

[75] Inventors: Donald I. Loofbourow, Canby; Robert E. Lach, Beavertown, both of Oreg.

[73] Assignee: GAF Corporation, New York, N.Y.

[21] Appl. No.: 780,647

[22] Filed: Mar. 23, 1977

[51] Int. Cl.² .................... G03B 1/04; G11B 15/32
[52] U.S. Cl. ................................. 242/205; 74/219
[58] Field of Search .................. 242/205, 200–204; 74/219, 220

[56] References Cited

U.S. PATENT DOCUMENTS 3,286,943  11/1966  Morimoto ........................ 242/201

Primary Examiner—Leonard D. Christian
Attorney, Agent, or Firm—Walter C. Kehm; J. Gary Mohr

[57] ABSTRACT

A film web handling mechanism includes a motor for driving the mechanism, and an endless belt for transferring the motor drive to a supply pulley, a take-up pulley and a shuttle-shuttle drive pulley. The supply pulley and the take-up pulley are connected, through a supply clutch and a take-up clutch, to a supply spindle and a take-up spindle. The endless belt is driven in one direction only by the motor, however, the supply and take-up spindles are capable of moving the film web in both a forward and reverse direction. The forward and reverse direction capability of the supply and take-up spindles is accomplished by varying the amount of motor drive transferred to the spindles through the clutches. By means of a single control knob linked to the supply clutch and to the take-up clutch, an operator is able to select a mode of operation.

5 Claims, 13 Drawing Figures

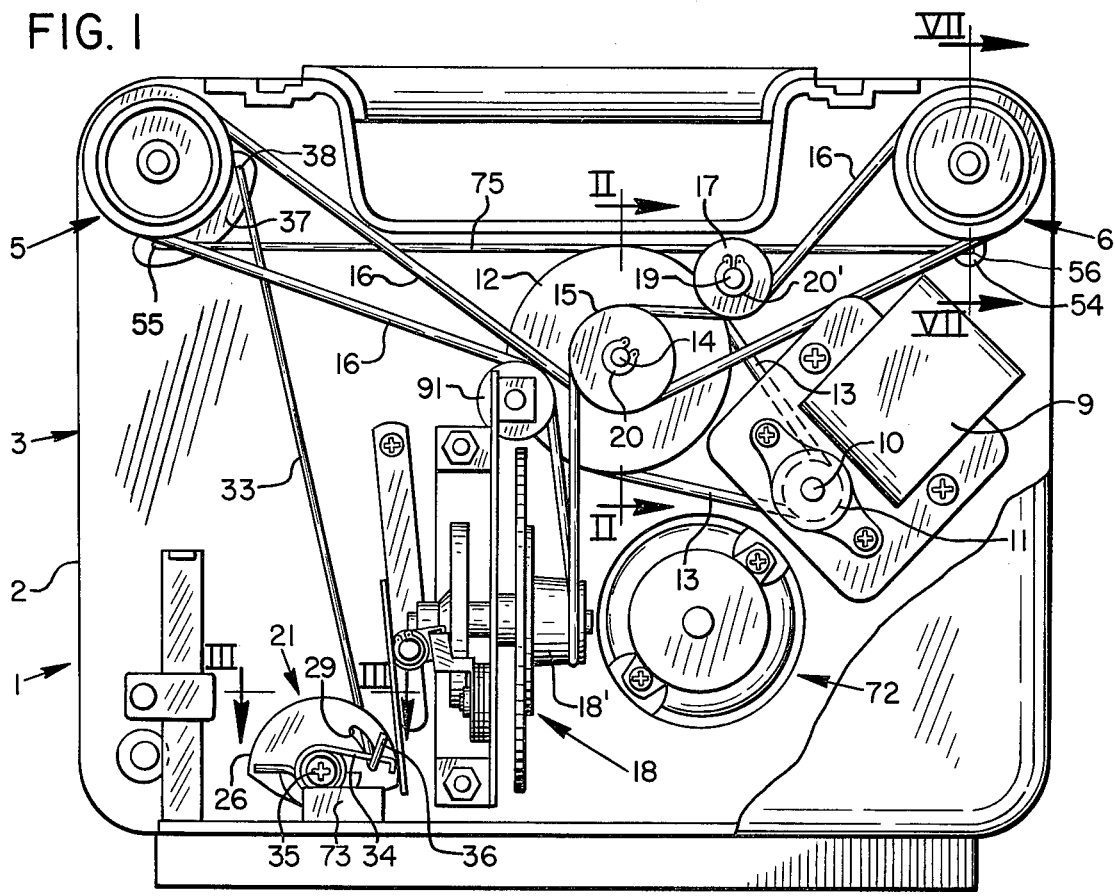
FIG. 1
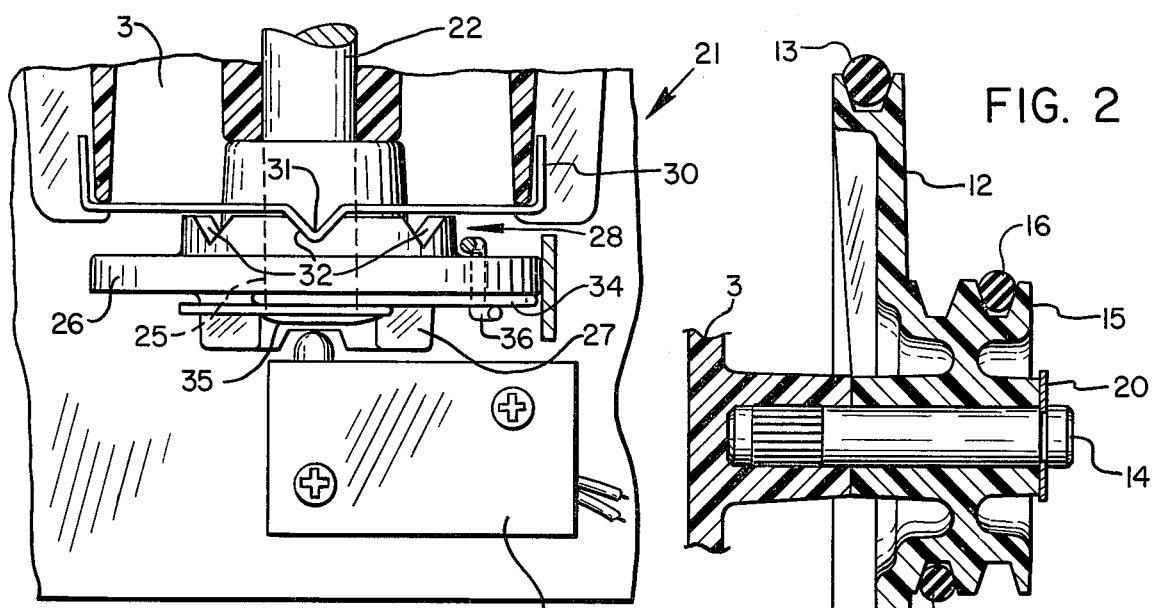
FIG. 3
FIG. 2

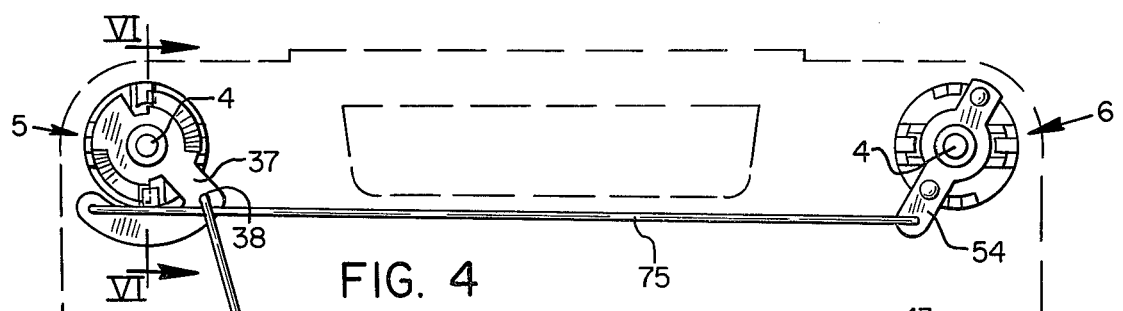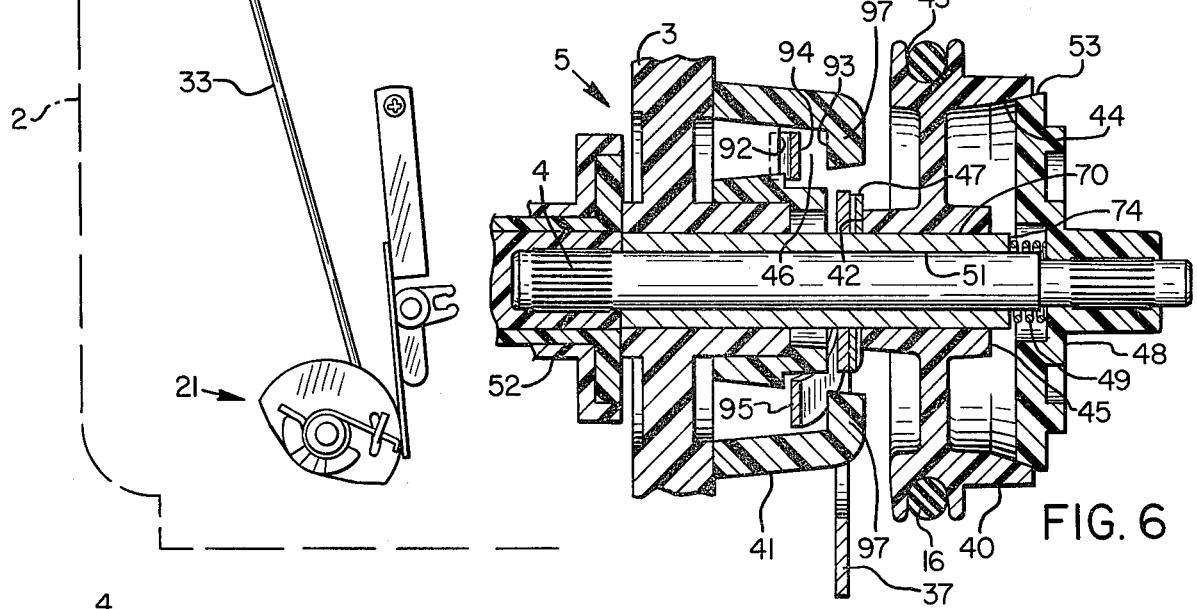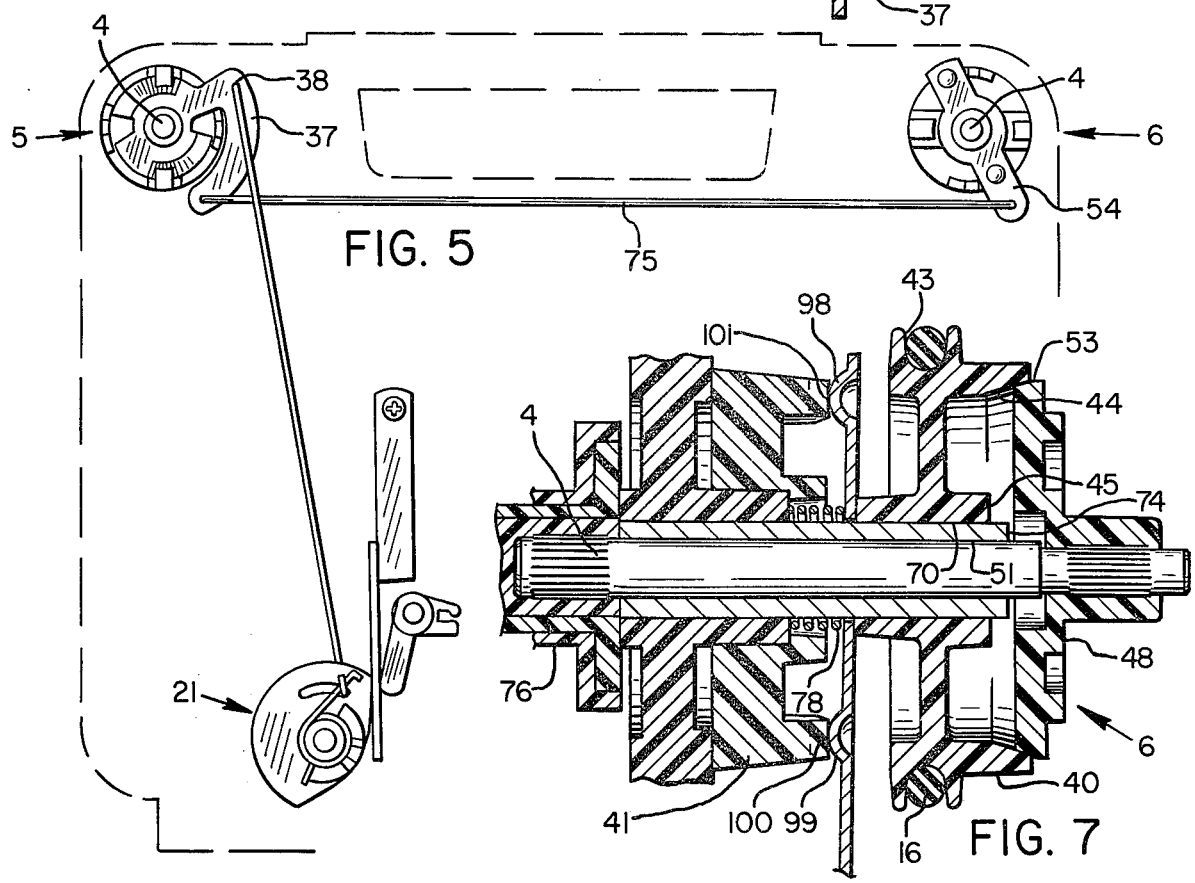

FILM WEB HANDLING MECHANISM

BACKGROUND OF THE INVENTION

The present invention relates generally to the field of motion picture projectors and is more specifically directed to a clutch drive mechanism for the supply and take-up film spindles of such a projector.

The use of clutches for driving supply and take-up spindles for motion picture projectors and cameras is well known in the art. One such drive is disclosed in U.S. Pat. No. 2,791,933 to Crockett. In that patent a film feed spool and a film take-up spool are connected through clutches to a motor for intermittently rotating said spools. Each spool is formed of two concentric tubes which may be of magnetic material. These tubes are secured together at one end by a flange and at the other end by an insulating ring. An annular space between these tubes contains a coil of insulated wire, the ends of the insulated wire are connected to concentric slip rings. A shaft of magnetic material is disposed axially of the spool and rotatably supported therein by a bearing at each end of the shaft. An annular space between the shaft and the inside surface of the inner tube is fitted with a Carbonyle iron powder and the tube is sealed at both ends. When a direct current flows through the coil of insulated wire a magnetic field is established through the powder which causes it to solidify and lock the spool and shaft together for conjoint rotation. Upon the coil being deenergized the powder is returned to a fluid state to permit the shaft to rotate within the tube without causing the tube to rotate.

This device, however, is complicated, requires electrical connection, is heavy and is not provided with internal braking means.

Another form of drive for film spindles is disclosed in U.S. Pat. No. 3,481,662 to Procop. Procop discloses a pair of pivotally mounted rollers for control of the supply spindle and a separate pair for control of the take-up spindle. In addition it discloses a pivotally mounted motor drive pulley to obtain directional control of an endless belt. The disadvantage of this drive mechanism is that it is complex and requires direction control of the endless belt to obtain directional control of the spindles.

A further disclosure of a clutch spindle drive means is illustrated in U.S. Pat. No. 3,677,498 to Johnson, where the amount of drive transfered between a drive motor and the film spindle is controlled by the change in weight of the reel as the film collects on the reel. The disadvantage of this mechanism is the lack of means for operator control in order to vary the transfer of motor drive to a selected spindle to obtain different modes of operation. In addition to this, since the clutch is operated by the weight of the film reel is an axial direction along the spindle axis, it would be unsuitable for conventional projectors in which the film reel weight is normal to the spindle axis.

A primary object of the present invention is to provide a new clutch and linkage arrangement with a drive belt driven in one direction only for advancing a film web in one of two different directions and at selected different speeds between a supply film reel and a take-up film reel.

Another object of the invention is to provide a new clutch and linkage arrangement for moving the film web in a selected direction and at selected operating speeds, wherein the desired operating position of the clutch and linkage arrangements are determined by movement of a single control means, which permits selection of any one of a plurality of modes of operation, such as "off", "braking", "rewind", "reverse", "forward", and "fast forward".

Still another object of the invention is to provide a motion picture projector having the aforementioned features and yet being of a simplified construction lending itself to low cost manufacturing.

SUMMARY OF THE INVENTION

The present invention represents an improvement in a supply and take-up reel drive mechanism in a web handling device. The improvements and objectives of the invention are accomplished by providing simple compact clutch assemblies for transmitting a variable rotational force between a motor drive and the supply and take-up reels.

The improvement lies in the simple construction of the clutch assembly and the means for operating the clutch assembly. The clutch assembly imparts to the supply and takeup reel the correct drive force for a chosen mode of operation selected by an operator of the web handling mechanism. The clutch assembly is comprised of a clutch disc carried on a clutch disc shaft for rotational movement. Rotation of the clutch disc thus causes the clutch disc shaft to rotate. The clutch disc shaft is affixed to a spindle for the supply or take-up reels which is caused to rotate with rotation of the clutch disc. Mounted on the supply or take-up spindle for rotational movement is a supply or take-up reel for collecting or expelling a film web. The clutch disc is located within a clutch plate housing. The clutch plate housing comprises an inner front surface for mating with the clutch disc, an outer grooved surface around the periphery thereof, and a rear surface. The clutch plate housing is journaled for rotational and axial movement along a clutch plate shaft fixedly attached to a mounting plate. The clutch plate shaft has a shaftway extending through its geometric center. The shaftway journals the clutch disc shaft for rotational movement.

An endless drive belt supported in the grooved periphery of the clutch plate housing imparts rotational movement to the clutch plate housing. The endless belt is driven from a two stage drive pulley mounted for rotational movement on the housing.

Located adjacent the rear surface of the clutch plate housing is a cam follower lever journaled for rotational and axial movement along the clutch plate shaft. Separated from the rear surface of the clutch plate housing by the cam follower lever is a cam surface. The cam surface is fixedly attached to the mounting plate. Movement of the cam follower lever along the cam surface causes the cam follower lever to move axially in and out of contact with the rear surface of the clutch plate housing. This movement urges the clutch plate housing into or out of mating contact with the clutch disc.

A mating force develops between the clutch plate housing and the clutch disc that is proportional to the axial movement of the clutch plate housing. Depending on the mating force that is exerted, the clutch disc will either rotate, slip or remain stationary when the endless drive belt imparts rotational movement to the clutch plate housing.

The movement of the cam follower lever is a result of movement of the mode selector assembly connected to the supply and take-up clutch assembly by the linkage assembly. Movement of a mode selector knob of the mode selector assembly cause the linkage assembly to move the cam follower levers of the supply and take-up clutch assemblies to various positions along the cam surface. When the levers are in a position corresponding to the desired mode of operation set by the mode selector knob, the supply and take-up spindles will impart the proper rotational movement to the reels.

The drive belt for the mechanism always drives in one direction irrespective of the direction of rotation of the supply and take-up spindles.

DESCRIPTION OF THE DRAWINGS

FIG. 1 is a side elevational view of a motion picture projector with the back covering of the projector removed showing arrangement of the clutch assemblies, mode selector assembly and belt drive assembly for a projector having two modes of operation;

FIG. 2 is a sectional view taken along lines II—II of FIG. 1 of a two stage main drive pulley;

FIG. 3 is a partial plan view of a mode selector assembly taken along lines III—III of FIG. 1;

FIG. 4 is an isolation view of the mode selector assembly, supply and take-up clutch assemblies with the connecting linkage shown in the rewind mode of a two mode projector;

FIG. 5 is a view similar to FIG. 4, showing the connecting linkage in the forward mode of operation;

FIG. 6 is a cross-sectional view of the supply clutch assembly taken generally along the lines of VI—VI of FIG. 4;

FIG. 7 is a cross-sectional view of one type of take-up clutch assembly taken generally along the lines VII—VII of FIG. 1;

DESCRIPTION OF A PREFERRED EMBODIMENT

For purposes of illustration, the present invention is shown and described as embodied in a motion picture projector. However, it will be understood by those skilled in the art that the invention is not to be limited for use with such a projector, and may be utilized with other devices.

Figure 8:
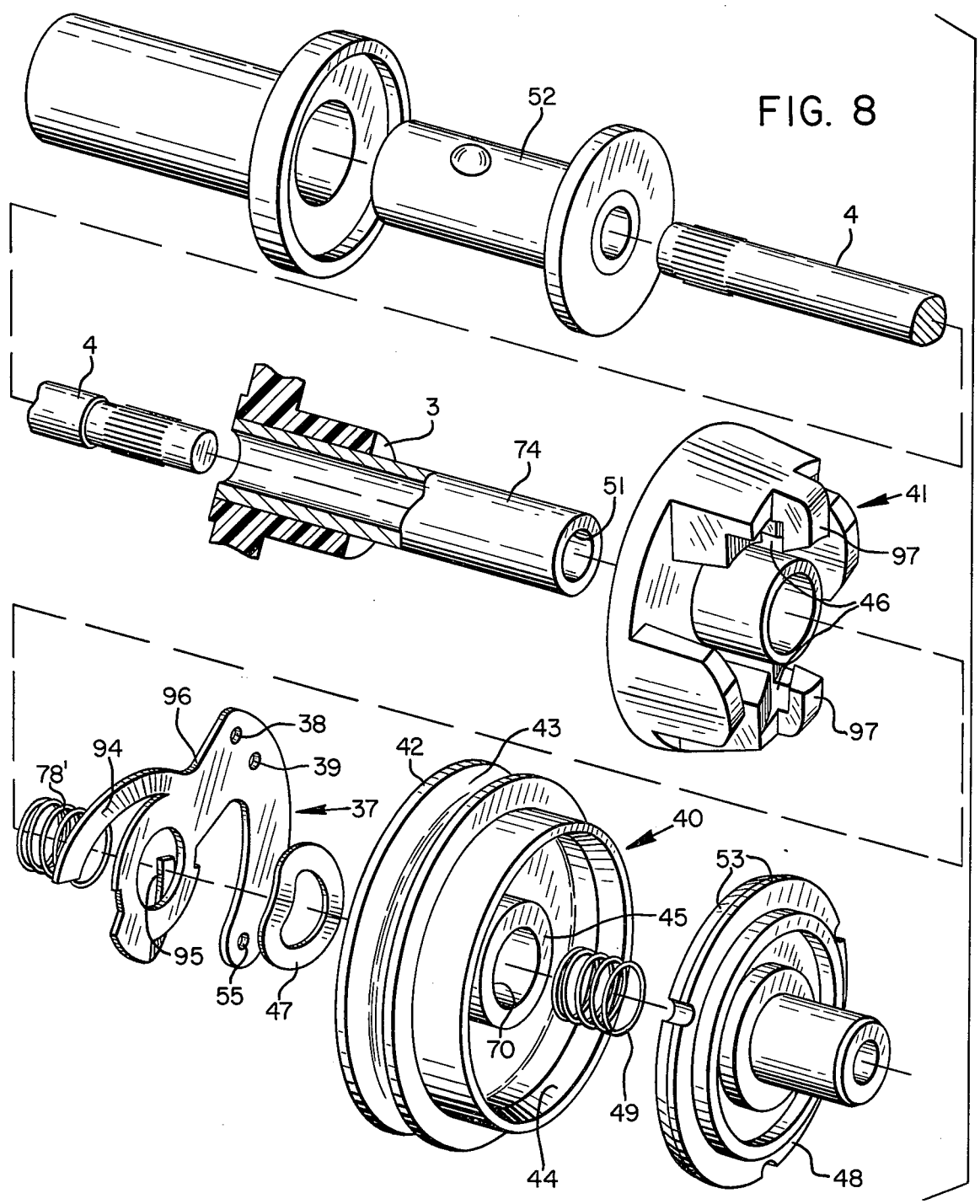
FIG. 8 is an exploded perspective view of one clutch assembly.

Referring now in more detail to the accompanying drawings, FIG. 1 shows a motion picture projector generally indicated at 1. The motion picture projector 1, has an outside housing 2 containing a mounting plate 3. Mounting plate 3 mounts a first clutch housing shaft 4 (see FIG. 8) for supporting supply clutch drive assembly 5, shown in greater detail in FIG. 6, and mounts a second clutch housing shaft 4 for supporting take-up clutch drive assembly 6, shown in greater detail in FIG. 7, or for supporting an alternate type of take-up clutch drive assembly 8, shown in FIG. 9 to be described more fully hereinafter. Also mounted on mounting plate 3, is a drive motor assembly 9. Drive motor assembly 9 has a drive shaft 10, for imparting rotational movement to a drive pulley 11 mounted on drive shaft 10. Drive pulley 11 is in rotational driving contact with a main drive pulley 12, by means of an endless belt 13. Main drive pulley 12 is journaled for rotational movement on main drive shaft 14, which is fixedly mounted on mounting plate 3. Also journaled on main drive shaft 14, and fixedly attached to the main drive pulley 12, is a high speed drive pulley 15.

Both the high speed drive pulley 15 and the main drive pulley 12 are rotationally mounted to the main drive shaft 14 by a "c" ring clamp 20. Endless belt 16 is driven by high speed pulley 15 over an idler pulley 17, the take-up clutch assembly 6 or 8, the supply clutch assembly 5, idler pulley 91 and a shutter-shuttle assembly drive pulley 18. Idler pulley 17 is journaled for rotational movement on an idler shaft 19 which is fixedly attached to mounting plate 3. A "c" ring clamp 20' secures idler pulley 17 to idler shaft 19. Idler pulley 91 may be mounted on the shutter-shuttle assembly.

The shutter-shuttle drive pulley 18' drive various elements of a shutter-shuttle mechanism (indicated generally as reference numeral 18). Said shutter-shuttle assembly 18 is mounted to mounting plate 3 and intercepts a light beam transmitted along the optical axis of the projector 1, by a light source 72. In addition to intercepting the light beam the shutter-shuttle assembly 18 also drives a film web through a projection gate. Said shutter-shuttle assembly 18 however forms no part of the present invention.

Figure 9:
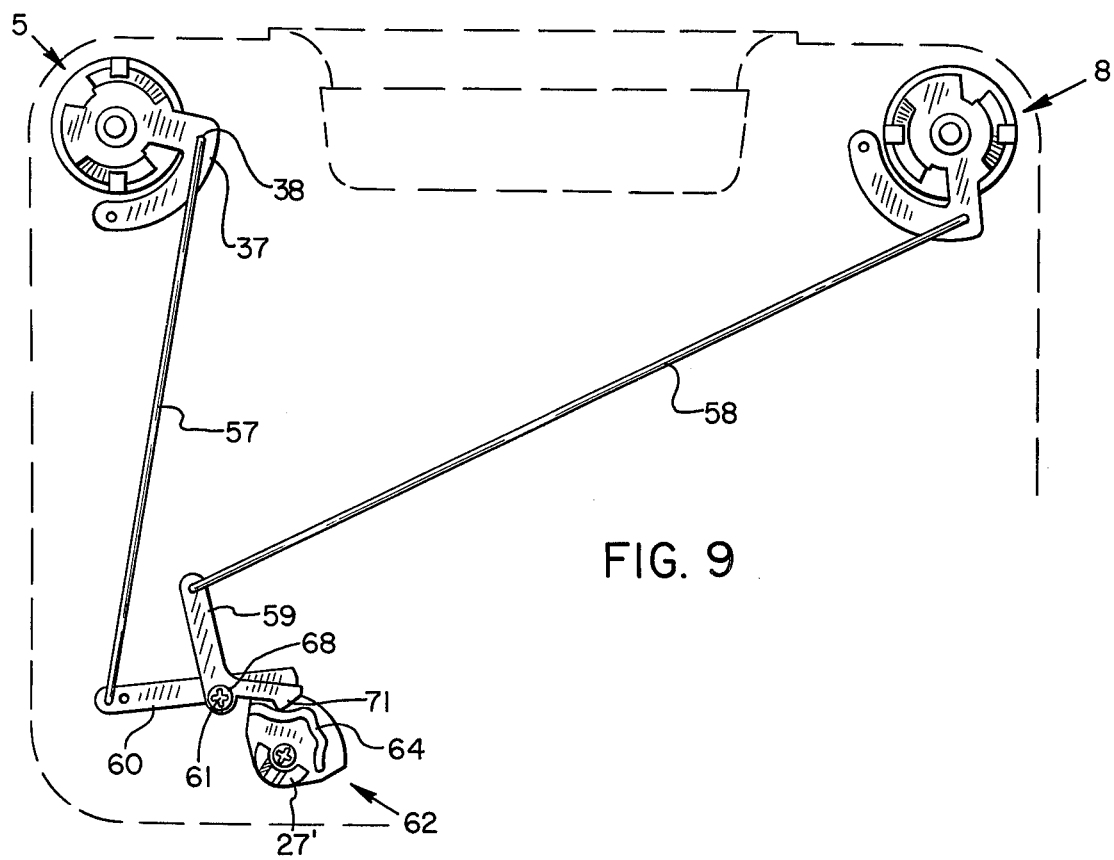
FIG. 9 is an isolation view of the mode selector assembly, supply and take-up clutch assemblies with connecting linkage for a projector having more than two (multiple) modes of operation.
Figure 10:
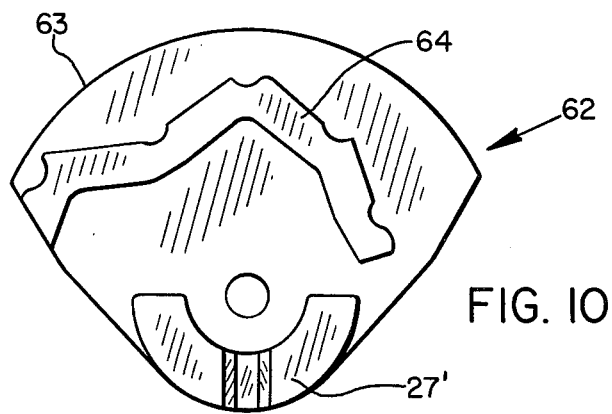
FIG. 10 is an isolation front view of the mode selector assembly for a multiple mode projector.
Figure 11:
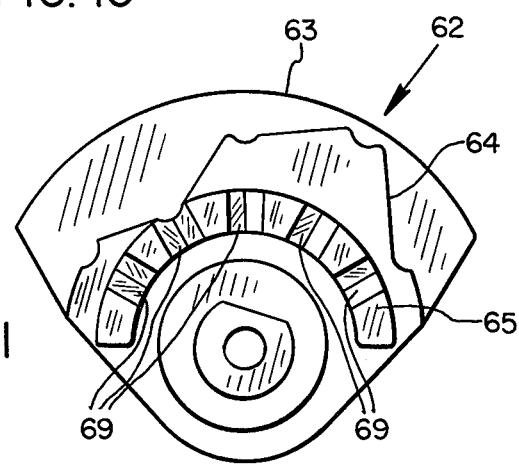
FIG. 11 is an isolation back view of the mode selector assembly for a multiple mode projector.

A mode selector assembly 21, as viewed in FIG. 3, has a mode selector shaft 22, journaled for rotational movement on mounting plate 3. Mode selector shaft 22, has an end 25 projecting through one side of mounting plate 3. The other end of shaft 22 mounts a control knob, not shown, and end 25 mounts a dual function actuator 26. Dual function actuator 26 has an actuating surface 27 on one side thereof, another actuating surface 28 on the other side thereof and a slot 29. The actuating surface 27, upon rotation of mode selector shaft 22, makes contact with a motor switch 73. The motor switch 73, upon actuation by contact with said actuating surface 27, is moved to an "on" or "off" position. In the "on" position it activates drive motor 9 and in the "off" position it deactivates drive motor 9. The actuating surface 28 makes contact with a position detent rod 30. The position detent rod 30 is secured to mounting plate 3 and has a projection 31 extending outwardly from the mounting plate 3. Projection 31 retains dual function actuator 26 by seating within a mode selector notch 32 of the dual function actuator 26 when the mode selector shaft 22 is rotated to a desired mode of operation. Within the slotted actuating surface 29 is located a supply clutch assembly control link 33. A hooked portion 36 of the supply clutch assembly control link 33 is retained within the slotted actuating surface by an override retaining spring 34, which compensates for lost motion travel of the supply clutch assembly control link 33 within the slot 29. Override retaining spring 34 is secured by screw 35 to end 25 of the mode control shaft. Screw 35 also secures dual function actuator 26 to end 25 of the mode control shaft. Upon rotation of the mode selector shaft 22 clutch assembly control link 33 moves a supply clutch cam follower lever 37 having fingers 94 and 95 that are offset from the main body 96 of the supply clutch cam follower lever 37. Supply clutch cam follower lever 37 is connected to supply clutch assembly control link 33 by means of a hook, now shown, inserted into an opening 38 of supply clutch cam follower lever 37. The supply clutch cam follower lever 37 as shown in FIGS. 6 and 9 is journaled on clutch housing bushing 74 for rotational and axial movement. Supply clutch cam follower lever 37 is located between a clutch plate housing 40 and a cam 41. Clutch plate housing 40 is journaled on clutch housing bushing 74 for rotational and axial movement. The clutch plate housing 40 has a rear surface 42, an inner peripheral tappered surface 44 having a tappered slope between 10° and 35° depending on the material used for constructing said housing 40, a peripheral grooved surface 43, a front surface 45, and a mounting bore 70. Cam 41 is fixedly attached to or integral with mounting plate 3. Mounted on cam 41 is a retaining assembly 97 which forms a retaining slot 46 in which the supply cam follower lever 37 rotates.

As supply cam follower lever 37 rotates within retaining slot 46 fingers 94 and 95 move along both the inside cam surface 92 and the outside cam surface 93 of slot 46 of cam 41 and is caused to move axially toward or away from the rear surface 42 of clutch plate housing 40. Cam follower lever 37, however, is constricted in its axial movement toward clutch plate housing 40 by retaining assembly 97. A bowed washer 47 is located on clutch plate housing bushing 74 between the cam follower lever 37 and the rear surface 42 of clutch plate housing 40 to maintain spacing between the cam follower lever 37 and the cam 41.

Clutch plate housing bushing 74 has a shaftway 51 through its center in order to journal the shaft 4 for rotational movement therein. Mounted on one end of shaft 4 is a supply spindle 52, and on the other end is a clutch disc 48. The clutch disc 48 has a tappered peripheral surface 53 which has an inclined surface ranging between 10° and 35° C depending on material used for construction of the disc 48 for mating with the inner peripheral surface 44 of clutch housing plate 40. Separating the bushing 74 and the clutch disc 48 is release spring 49 for urging clutch disc 48 out of contact with the clutch plate housing 40, as well as for maintaining spacing between the clutch plate housing 40 and the clutch disc 48.

The axial movement of the cam follower lever 37 causes an axial movement of clutch plate housing 40. This in turn causes peripheral surface 44 to make or break mating contact with peripheral surface 53. When peripheral surface 44 and peripheral surface 53 are in positive contact rotation of clutch plate housing 40 by endless belt 16 moving across peripheral groove 43 causes simultaneous rotation of clutch disc 48 and spindle 52.

Supply cam follower lever 37 is connected with a take-up cam follower lever 54 by means of an interconnecting control link 75 in order to operate the take-up clutch assembly. Link 75 has a hook like projection at each end, not shown, to retain it between a hole 55 of supply cam follower lever 37 and a hole 56 of a take-up cam follower lever 54. The take-up clutch cam follower lever 54, as shown in FIG. 7, has two protrusions 98 and 99 for contact with cam 41, and is journaled on clutch housing bushing 74 for rotational and axial movement. In the following description of the take-up clutch assembly, like parts with the supply clutch assembly, previously described are denoted by like reference numerals. Take-up clutch cam follower lever 54 is located between the clutch plate housing 40 and the cam 41. Clutch plate housing 40 is journaled on clutch housing bushing 74 for rotational and axial movement. The clutch plate housing 40 has a rear surface 42, a peripheral grooved surface 43, an inner peripheral tappered surface 44 and a front abutting surface 45. Cam 41 is fixedly attached to or integral with mounting plate 3. Mounted on cam 41 are two cam surfaces 100 and 101 on which the two protrusions 98 and 99 of the take-up cam follower lever 54 operates. As take-up cam follower lever 54 rotates on cam surfaces 100 and 101, it is urged axially toward or away from rear surface 42 of clutch plate housing 40. A coil spring 78 located on clutch plate housing bushing 74 between cam 41 and lever 54 urges the take-up cam follower lever 54 into contact with the rear surface 42 of clutch plate 40. In this manner a partial slip condition will exist in the clutch assembly 6. A bowed spring, not shown, may be included on clutch housing bushing 74 in order to take up any spaces between various elements on the shaft.

As in the supply clutch assembly, clutch plate housing bushing 74 has a shaftway 51 through its center to journal shaft 4 for rotational movement. Mounted on one end of shaft 4 is a take-up spindle 76 and on the other end is a clutch disc 48. The clutch disc 48 has a tappered peripheral surface 53 for mating contact with the inner peripheral surface 44 of clutch plate housing 40.

The axial movement of the take-up cam follower lever 54 causes simultaneous axial movement of clutch plate housing 40 and the peripheral surface 44 to make or break mating contact with peripheral surface 53. When peripheral surface 44 and peripheral surface 53 are in positive contact rotation of clutch plate housing 40 by endless belt 16 moving across peripheral groove 43 causes simultaneous rotation of clutch disc 48 and spindle 76.

Since both supply cam follower lever 37 and take-up cam follower lever 54, are interconnected with the control mode assembly 21, movement of the control mode assembly effectuates cooperative movement between clutch assembly 5 and clutch assembly 6, so that both are in the proper condition for producing the mode selected by rotation of the mode control shaft 22.

Figure 13:
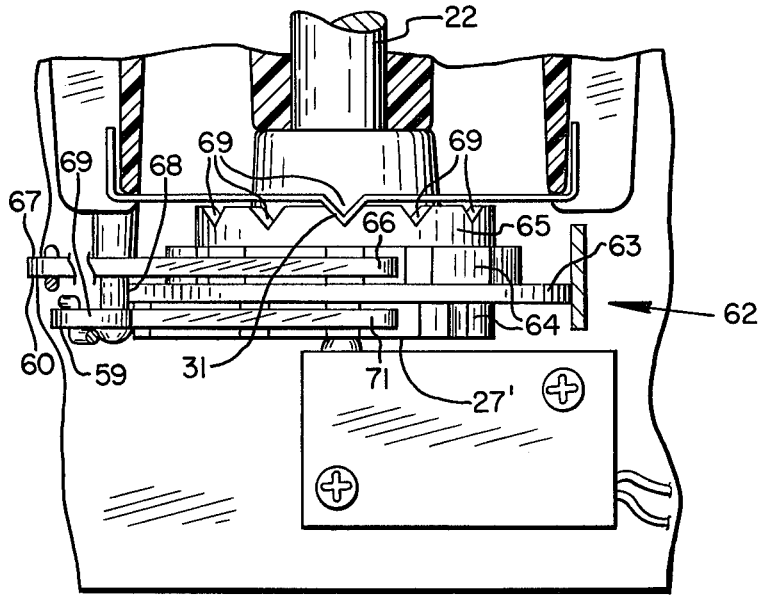
FIG. 13 is a cross-sectional view of the mode selector assembly for a multiple mode projector taken generally along lines 9—9 of FIG. 12.

The above describes the present invention as embodied in a projector having two modes of operation, namely, forward and rewind. The present invention may be embodied in a projector having the same or additional modes of operation by merely replacing both the take-up clutch assembly 6 and the supply clutch assembly 5 with a take-up and supply clutch assembly 8 shown in detail in FIG. 8. Take-up clutch assembly 8 is identical to supply clutch assembly 5, with the exception of its mounting position and the addition of further spring 78 located between lever 37 and cam 41. Modification of the linkage and mode control assembly from that shown in FIG. 3 to that shown in FIG. 13 is also required, as described later.

FIGS. 8–13 show the embodiment of a projector having more than two modes of operation.

Figure 12:
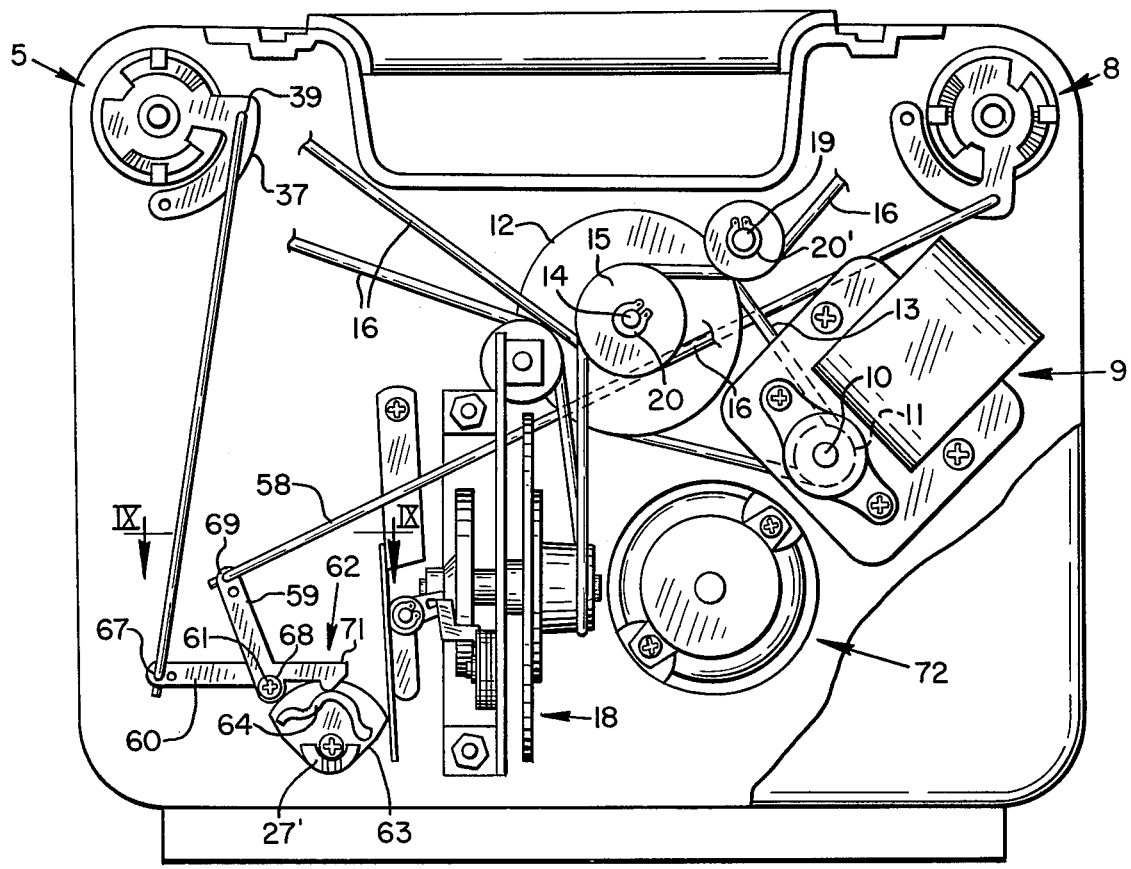
FIG. 12 is a side elevational view of a motion picture projector with the back covering of the projector removed showing details of the clutch assemblies, mode selector assembly and belt drive assembly for a multiple mode projector.

Referring now to FIG. 12 a mode selector assembly 62 is cooperatively linked to the supply clutch assembly 5 and the take-up clutch assembly 8 by a control lever 60, a take-up control lever 59, through a supply control rod 57, and a take-up control rod 58 respectively. Mode selector assembly 62 is similiar to mode selector assembly 21 with the exception that dual function actuator 26 is replaced with a dual cam actuator 63. Dual cam actuator 63 comprises a clutch control cam surface 64, an actuating surface 27' and an actuating surface 65. The actuating surface 27' is identical to and performs the same function as actuating surface 27 of mode selector assembly 21. Control lever 60 has a cam follower 66 at one end thereof, and a control rod retaining end 67, separated by a control lever mounting section 68. The lever mounting section 68 of lever 60 mounts take-up control lever 59 for pivotal movement thereabout. Take-up control lever 59 is substantially "L" shaped hving a cam follower 71 at the distal end of one of its legs and mounts take-up control rod 58 at the distal end of its other leg. Take-up control rod 58 connects the mode selection assembly 62 with the take-up clutch assembly 8. Control lever 60 in addition to pivotally mounting take-up control lever 59, carries supply control rod 57 at its control rod retaining end 67. Supply control rod 57 interconnects the mode selector assembly 62 with the supply clutch assembly 5. Upon rotation of mode selector shaft 22, cam followers 66, and 71 of control rods 60 and 59 respectively ride the clutch control cam surface 64, until the desired stop notch 69 is reached on the rear actuating surface 65. Each stop notch 69 corresponds to a different mode of operation for the projector 1. Mode selection assembly 62 is connected with the clutch assemblies 5 and 8 through levers 60 and 59 and rods 57 and 58. Movement of cam follower 66 of control rod 60, thus urges the clutch assemblies into the desired mode of operation selected by movement of the mode control assembly 62.

In operation, the desired mode of operation of the projector will be selected by turning the mode selector shaft 22 to the desired position. The turning of mode selector shaft 22 thereby causes the actuator 26 or 63 to move the clutch assemblies 5 and 6 or 8 into the mode selected by the operator. The clutch assemblies can vary from a condition of complete slip to complete non-slip, depending on the mode of operation selected. For example, in the rewind mode of operation the take-up clutch assembly spindle is in a partial slip condition while the supply clutch assembly spindle is in a positive drive condition. This provides drive to the supply reel for rewind while providing some tension to the film web, since the take-up spindle is not in a complete slip condition. In the forward mode of operation the supply clutch assembly spindle is in a condition to allow its substantial freedom of motion and the take-up clutch assembly is in condition of partial slip so that the single belt is driven in a direction such that the take-up spindle is being forwardly rotated. Notwithstanding the mode of opeation selected, endless belt 16 will continue to operate in one direction as long as it is driven by high speed drive pulley 15.

It will be appreciated from the foregoing that a very simple and relatively inexpensive mechanism is provided to control and select the various operating conditions of a projector through the use of the clutch and linkage assemblies and single belt drive of the present invention.

We claim:

1. An improved film web handling mechanism having a housing, a supply spindle and a take-up spindle rotatably mounted on said housing for transporting a film web therebetween, means for rotatably driving said spindles comprising a motor carried on said housing, an endless belt driven by said motor for movement in one direction only not withstanding the direction of movement of the supply second takeup spindles for imparting a rotational and directional drive force to said spindles, a rotatably mounted supply drive assembly and a rotatably mounted take-up drive assembly, each comprised of a pulley, a clutch means and a rotational drive control means, connected with said spindles for transmitting drive force from the endless belt to the spindles respectively, each of said supply and take-up drive assemblies being rotatably movable between at least a first operating position and a second operating position, each of said supply and take-up drive assemblies being operatively connected by said endless belt to a film web advancing mechanism for advancing said film web, a mode selector assembly mounted for rotation between at least a first and a second operating position connected with said supply drive assembly and said take-up drive assembly for selecting a mode of operating position on the respective supply drive and take-up drive assemblies so that the film web is driven in one mode of operation when said mode selector assembly, said supply drive assembly and said take-up drive assembly are in said first position and in a different mode of operation when said mode selector assembly, said supply drive assembly and said take-up drive assembly are in said second position.

2. The improvement according to claim 1, wherein said clutch plate housing is fixedly attached to or integral with the pulley and comprises a surface to mate with the clutch disc to impart rotational drive to said clutch disc.

3. The improvement according to claim 2, wherein the control lever is located adjacent the cam and the clutch plate housing to impart axial movement to the clutch plate housing as said control lever moves along the cam to urge the clutch plate housing and clutch disc into or out of mating contact.

4. The improvement according to claim 1, wherein a connecting rod assembly connects the single mode selector means to the supply drive and take-up drive assembly, so that upon rotation of the single mode selector means said connecting rod assembly causes axial and rotational movement of the control levers to place said supply and take-up drive assemblies in a desired position.

5. The improvement according to claim 4, wherein a selected mode of operation is proportional to a mating force developed between the clutch disc and the clutch plate housing.

* * * * *